(12) United States Patent
Komine et al.

(10) Patent No.: US 8,982,786 B2
(45) Date of Patent: Mar. 17, 2015

(54) INITIAL ACCESS SETTING INFORMATION GENERATING APPARATUS, METHOD, AND PROGRAM, AND BASE STATION APPARATUS

(75) Inventors: Toshihiko Komine, Fujimino (JP); Toshiaki Yamamoto, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 298 days.

(21) Appl. No.: 13/244,982

(22) Filed: Sep. 26, 2011

(65) Prior Publication Data

US 2012/0076075 A1 Mar. 29, 2012

(30) Foreign Application Priority Data

Sep. 28, 2010 (JP) ................................. 2010-216287

(51) Int. Cl.
*H04W 4/00* (2009.01)
*H04W 74/00* (2009.01)

(52) U.S. Cl.
CPC ................................... *H04W 74/006* (2013.01)
USPC ........................................................ 370/328

(58) Field of Classification Search
None
See application file for complete search history.

(56) References Cited

U.S. PATENT DOCUMENTS

2010/0232318 A1* 9/2010 Sarkar ............................ 370/254
2010/0255847 A1* 10/2010 Lee et al. ...................... 455/436

FOREIGN PATENT DOCUMENTS

| JP | 2009-055356 A | 3/2009 |
|---|---|---|
| JP | 2009-296464 A | 12/2009 |
| JP | 2010-004505 A | 1/2010 |
| WO | 2009/154412 A2 | 12/2009 |

OTHER PUBLICATIONS

Amirijoo et al., On Self-Optimization of the Random Access Procedure in 3G Long Term Evolution, 2009 IFIP/IEEE International Symposium on Integrated Network Management-Workshops, pp. 177-184, Jun. 2009.
3GPP TS 36.300 v9.3.0 (Mar. 2010), Evolved Universal Terrestrial Radio Access (E-UTRA) and Evolved Universal Terrestrial Radio Access Network (E-UTRAN), Stage 2, Release 9, pp. 55-58.
3GPP TS 36.213 v9.1.0 (Mar. 2010), Evolved Universal Terrestrial Radio Access (E-UTRA), Physical layer procedures, Release 9, pp. 16-17.
JPO—Office Action for Japanese Patent No. 2010-216287—Issued on Jul. 9, 2013. Including English Translation.

* cited by examiner

*Primary Examiner* — Kouroush Mohebbi
(74) *Attorney, Agent, or Firm* — Morgan, Lewis & Bockius LLP (57) ABSTRACT

An initial access setting information generating apparatus includes a preamble information transmission number obtaining unit that receives and obtains the number of transmissions for preamble information in a non-contention type initial access procedure performed between a base station and a communication terminal, where the preamble information transmission number obtaining unit receives and obtains the number of transmissions after the initial access procedure is completed; an expected reception power determination unit that determines an expected reception power at the base station, based on the number of transmissions for the preamble information, which is obtained by the preamble information transmission number obtaining unit; and a set value communication unit that generates and outputs initial access setting information about the initial access procedure for the communication terminal, based on the expected reception power determined by the expected reception power determination unit.

15 Claims, 4 Drawing Sheets

INITIAL ACCESS SETTING INFORMATION GENERATING APPARATUS, METHOD, AND PROGRAM, AND BASE STATION APPARATUS

BACKGROUND OF THE INVENTION

1. Field of the Invention

The present invention relates to an initial access setting information generating apparatus, an initial access setting information generating method, an initial access setting information generating program, and a base station apparatus, so as to generate initial access setting information used in an initial access procedure performed between a base station and a communication terminal.

Priority is claimed on Japanese Patent Application No. 2010-216287, filed Sep. 28, 2010, the contents of which are incorporated herein by reference.

2. Description of the Related Art

In an LTE (long term evolution) specification, when a communication terminal is powered on, or handover (switching of the base station) occurs, an initial access procedure (called "random access procedure") is performed between a communication terminal and a base station (after handover (if handover is performed)) so as to establish the communication between the communication terminal and the base station. Additionally, in LTE, a contention based (i.e., contention type) random access procedure and a non-contention based (i.e., non-contention type) random access procedure are defined (see, for example, Non-Patent Document 1).

In the contention based random access procedure, the communication terminal first starts the operation. For example, a communication terminal, which has been powered on or whose state is switched from an idle state to a connected state, starts the contention based random access procedure by sending a "random access preamble" (preamble information) to a base station.

In the non-contention based random access procedure, the base station first starts the operation. For example, if handover occurs between base stations, the new base station for the handover from the previous base station generates a specific signal for the handover, and communicates the signal to the previous base station. The previous base station then sends a random access preamble assignment to a communication terminal as a target for the relevant communication.

That is, the new base station for the handover starts the non-contention based random access procedure via the previous base station. In the non-contention based random access procedure, the communication terminal which received the random access preamble assignment sends a random access preamble (preamble information) to the new base station.

The transmission (electric) power of the random access preamble sent from a communication terminal in the contention based or non-contention based random access procedure is determined based on initial access setting information sent from the relevant base station to the communication terminal. In accordance with Non-Patent Document 2 (a specification for LTE), transmission power (value) $P_{RACH}$ of the random access preamble from a communication terminal is represented by Formula (1):

$$P_{RACH} = \min\begin{pmatrix} P_{CMAX}, P_{PIRTP} + PL + \\ (preambleTransmissionCounter - 1) \times powerRampingStep \end{pmatrix} \quad (1)$$

Where $P_{CMAX}$ indicates a maximum transmission power which is specifically assigned to the communication terminal; $P_{PIRTP}$ is an expected reception power (called "preamble initial received target power") at the base station; PL (path loss) is a path loss value measured by the communication terminal; "preambleTransmissionCounter" indicates how many times the random access preamble has been sent; and "powerRampingStep" indicates an increase when the random access preamble is retransmitted.

In Formula (1), the expected reception power $P_{PIRTP}$ and the power increase powerRampingStep are information included in the initial access setting information sent from the base station to the communication terminal.

The random access preamble sent from the communication terminal may receive interference from a base station adjacent to the target base station. Therefore, it is desirable for the communication terminal to set the transmission power in accordance with isolation control information a variation in the state (e.g., wireless environment or the number of accesses from communication terminals) of such an adjacent base station.

Conventionally, a technique of adjusting the expected reception power $P_{PIRTP}$ based on statistical information measured by the base station has been examined (see, for example, Non-Patent Document 3). Non-Patent Document 3 discloses that $P_{PIRTP}$ is determined so as to obtain a constant rate of random access procedures in which transmission and reception of the random access preamble succeeded at the first time to all random access procedures, and the determined $P_{PIRTP}$ is contained in the initial access setting information.

Additionally, in LTE, the base station informs the communication terminal of the initial access setting information by including an amount of wireless resources for PRACHs (physical random access channels) in the initial access setting information, where the amount of wireless resources for PRACHs can be independently set at each base station. Since the amount of wireless resources for PRACHs may press the wireless resources of upward data channels, it is desirable for the base station to adjust the amount of wireless resources for PRACHs so as to prevent the random access preambles sent from the communication terminals from colliding with each other at the relevant base station.

Non-Patent Document 1: 3GPP TS 36.300 v9.3.0 2010-03, pp. 55-58

Non-Patent Document 2: 3GPP TS 36.213 v9.1.0 2010-03, pp. 16-17

Non-Patent Document 3: M. Amirijoo, P. Frenger, F. Gunnarsson, J. Moe and K. Zetterberg, "On self-optimization of the random access procedure in 3G Long Term Evolution", IFIP/IEEE International Symposium on Integrated Network Management-Workshops, 2009. IM '09, pp. 177-184, June, 2009

However, the technique for adjusting the expected reception power $P_{PIRTP}$ disclosed in Non-Patent Document 3 is not a measure performed by the base station (after the communication terminal retransmits the random access preamble) in accordance with a cause of the retransmission. The cause for the random access preamble retransmission may be degradation in the communication quality due to relatively low reception power or relatively large interference, or code collision. In the above-described conventional adjustment technique, when the random access preamble is retransmitted due to code collision, the base station may increase the expected reception power $P_{PIRTP}$ in spite that the amount of resources for the random access preamble should be increased. If such inappropriate initial access setting information is used, not only an object to reduce the number of random access preamble retransmissions (i.e., the number which indicates how many times the retransmission was executed) is not achieved, but also the interference to an adjacent base station or the consumption power of the relevant communication terminal may increase.

Similarly, when the random access preamble is retransmitted due to a decrease in the reception power or an increase in the interference power, the base station may increase the amount of resources for the random access preamble in spite that the expected reception power $P_{PIRTP}$ should be increased. If such inappropriate initial access setting information is used, not only is an object to reduce the number of random access preamble retransmissions not achieved, but also the efficiency of using the relevant system may be reduced by pressing the data channels.

SUMMARY OF THE INVENTION

In light of the above circumstances, an object of the present invention is to provide an initial access setting information generating apparatus, an initial access setting information generating method, an initial access setting information generating program, and a base station apparatus, so as to generate appropriate initial access setting information in accordance with a cause for retransmission of preamble information.

Therefore, the present invention provides an initial access setting information generating apparatus comprising:

a preamble information transmission number obtaining unit that receives and obtains the number of transmissions for preamble information in a non-contention type initial access procedure performed between a base station and a communication terminal, where the preamble information transmission number obtaining unit receives and obtains the number of transmissions after the initial access procedure is completed;

an expected reception power determination unit that determines an expected reception power at the base station, based on the number of transmissions for the preamble information, which is obtained by the preamble information transmission number obtaining unit; and a set value communication unit that generates and outputs initial access setting information about the initial access procedure for the communication terminal, based on the expected reception power determined by the expected reception power determination unit.

The above initial access procedure may be a random access procedure. The above preamble information may be a random access preamble.

In a typical example:

every time the preamble information transmission number obtaining unit receives and obtains the number of transmissions for the preamble information, the expected reception power determination unit computes and stores an expected reception power value at the base station based on the number of transmissions for the preamble information; and the expected reception power determination unit retrieves a most recent value from among the stored expected reception power values and determines the retrieved value to be the expected reception power, periodically.

Preferably, the set value communication unit generates and outputs contention type initial access setting information and non-contention type initial access setting information, based on the expected reception power determined by the expected reception power determination unit.

The present invention also provides an initial access setting information generating method comprising:

a preamble information transmission number obtaining step that receives and obtains the number of transmissions for preamble information in a non-contention type initial access procedure performed between a base station and a communication terminal, where the preamble information transmission number obtaining step receives and obtains the number of transmissions after the initial access procedure is completed;

an expected reception power determination step that determines an expected reception power at the base station, based on the number of transmissions for the preamble information, which is obtained by the preamble information transmission number obtaining step; and a set value communication step that generates and outputs initial access setting information about the initial access procedure for the communication terminal, based on the expected reception power determined by the expected reception power determination step.

The present invention also provides an initial access setting information generating program that makes a computer execute:

a preamble information transmission number obtaining step that receives and obtains the number of transmissions for preamble information in a non-contention type initial access procedure performed between a base station and a communication terminal, where the preamble information transmission number obtaining step receives and obtains the number of transmissions after the initial access procedure is completed;

an expected reception power determination step that determines an expected reception power at the base station, based on the number of transmissions for the preamble information, which is obtained by the preamble information transmission number obtaining step; and a set value communication step that generates and outputs initial access setting information about the initial access procedure for the communication terminal, based on the expected reception power determined by the expected reception power determination step.

The present invention also provides a base station apparatus comprising:

a preamble information transmission number obtaining unit that receives and obtains the number of transmissions for preamble information in a non-contention type initial access procedure performed together with a communication terminal, where the preamble information transmission number obtaining unit receives and obtains the number of transmissions after the initial access procedure is completed;

an expected reception power determination unit that determines an expected reception power, based on the number of transmissions for the preamble information, which is obtained by the preamble information transmission number obtaining unit; and a set value communication unit that generates and outputs initial access setting information about the initial access procedure for the communication terminal, based on the expected reception power determined by the expected reception power determination unit.

According to the present invention, it is possible to generate appropriate initial access setting information in accordance with a cause for retransmission of preamble information.

BRIEF DESCRIPTION OF THE DRAWINGS

FIGS. 2A and 2B are sequence diagrams, each of which shows a random access procedure performed between a communication terminal and a base station, where

DETAILED DESCRIPTION OF THE INVENTION

Hereinafter, embodiments of the present invention will be described with reference to the appended figures.

Figure 1:
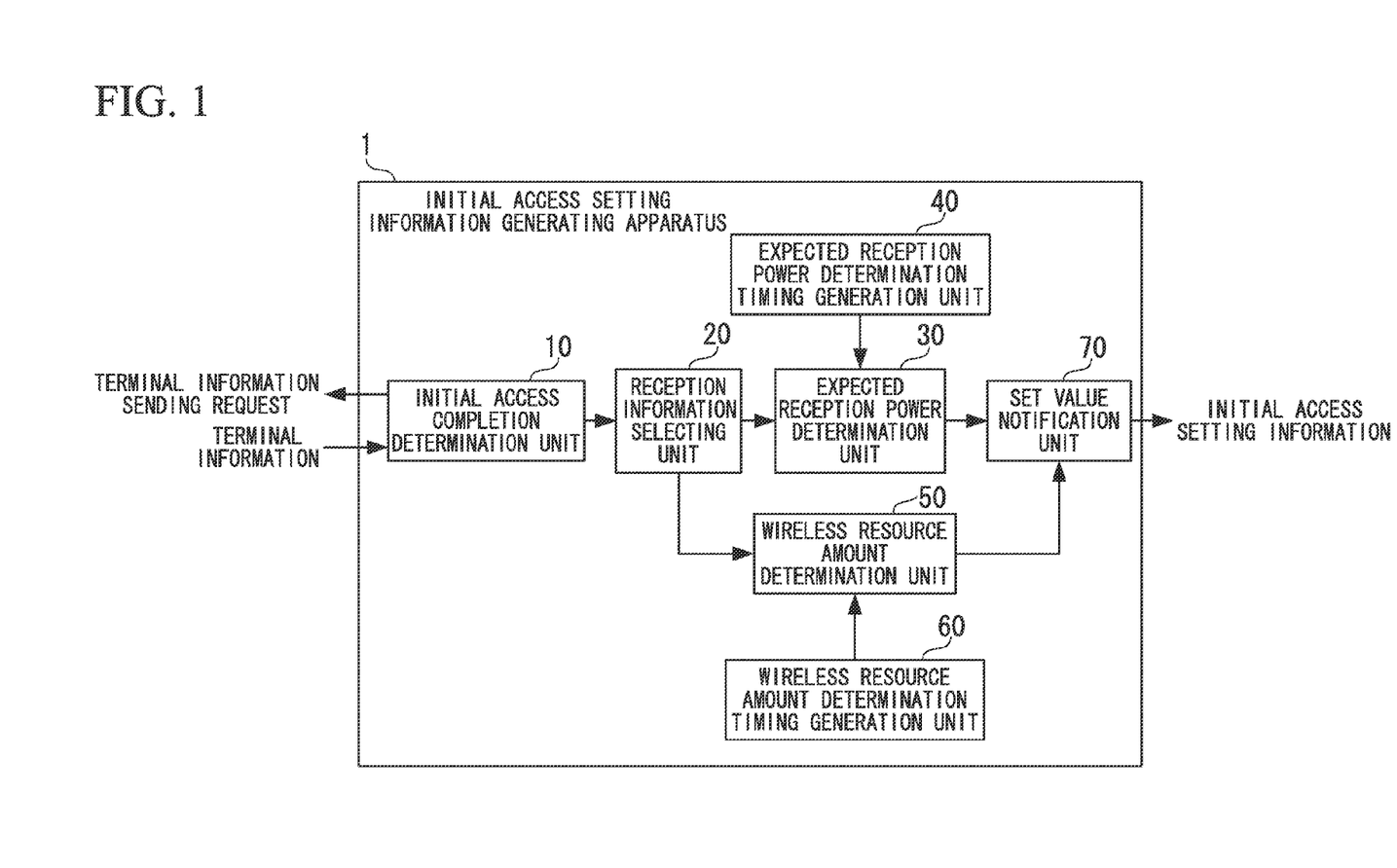
FIG. 1 is a block diagram showing the functional structure of an initial access setting information generating apparatus as an embodiment of the present invention.

FIG. 1 is a block diagram showing the functional structure of an initial access setting information generating apparatus 1 as an embodiment of the present invention. As shown in FIG. 1, the initial access setting information generating apparatus 1 includes an initial access completion determination unit 10 (as the preamble information transmission number obtaining unit of the present invention), a reception information selecting unit 20, an expected reception power determination unit 30, an expected reception power determination timing generation unit 40, a wireless resource amount determination unit 50, a wireless resource amount determination timing generation unit 60, and a set value notification unit 70.

In the present embodiment, the initial access setting information generating apparatus 1 is provided at a base station (not shown). Therefore, the initial access setting information generating apparatus 1 may be provided in a base station apparatus (not shown).

The initial access completion determination unit 10 determines, for each communication terminal (not shown), whether or not a random access procedure (abbreviated as "RA procedure" hereinbelow), which is an initial access procedure performed between the present base station and the communication terminal before synchronization, has been completed. The communication terminal is a terminal operated by a user, such as a cellular phone, a portable information terminal, or a smartphone.

If determining that the RA procedure has been competed, the initial access completion determination unit 10 obtains the type of the RA procedure. The type is a contention type or a non-contention type. Specific RA procedures for each type will be shown later.

Additionally, the initial access completion determination unit 10 requests the communication terminal, for which the RA procedure completion has been determined, to send terminal information (i.e., UE (user equipment) information). The initial access completion determination unit 10 then acquires the terminal information, which is sent from the communication terminal in response to the terminal information sending request and is received by the present base station. The terminal information includes information which indicates the number of transmissions of a random access preamble (which will be abbreviated as an "RA preamble" and is preamble information in the RA procedure), where the number of transmissions indicates how many times the transmission was executed. From the acquired terminal information, the initial access completion determination unit 10 extracts the information which indicates the number of RA procedure transmissions.

The initial access completion determination unit 10 then supplies RA procedure type information which indicates the type of the RA procedure and the information which indicates the number of RA procedure transmissions, to the reception information selecting unit 20.

The reception information selecting unit 20 acquires the RA procedure type information and the information which indicates the number of RA procedure transmissions, which are supplied from the initial access completion determination unit 10. The reception information selecting unit 20 then performs determination about the RA procedure type information.

If determining that the RA procedure type information indicates the non-contention type, the reception information selecting unit 20 supplies the information which indicates the number of RA procedure transmissions, as non-contention type preamble transmission number information, to the expected reception power determination unit 30.

If determining that the RA procedure type information indicates the contention type, the reception information selecting unit 20 supplies the information which indicates the number of RA procedure transmissions, as contention type preamble transmission number information, to the wireless resource amount determination unit 50.

The expected reception power determination unit 30 includes a random access "expected reception power" storage unit (not shown) for storing an expected reception power (value) (which may be called "preamble initial received target power"). This expected reception power storage unit has a capacity for storing at least one expected reception power (value). The expected reception power indicates a reception power expected at the present base station, and may be $P_{PIRTP}$ in Formula (2) which indicates transmission power $P_{RACH}$ of the RA preamble for the communication terminal. Here, the subscript "PIRTP" of $P_{PIRTP}$ is an abbreviation of "Preamble Initial Received Target Power".

$$P_{RACH} = \min\begin{pmatrix} P_{CMAX}, P_{PIRTP} + PL + \\ (preambleTransmissionCounter - 1) \times powerRampingStep \end{pmatrix} \quad (2)$$

In Formula (2), $P_{CMAX}$ indicates a maximum transmission power which is specifically assigned to the communication terminal; PL (path loss) is a path loss value measured by the communication terminal; "preambleTransmissionCounter" indicates the how many times the PA preamble has been transmitted (i.e., the number of transmissions); and "powerRampingStep" indicates an increase when the RA preamble is retransmitted.

In Formula (2), the expected reception power $P_{PIRTP}$ and the power increase powerRampingStep are information included in the initial access setting information sent from the base station to the communication terminal.

Every time when the non-contention type preamble transmission number information is supplied from the reception information selecting unit 20, the expected reception power determination unit 30 acquires the non-contention type preamble transmission number information, computes the expected reception power $P_{PIRTP}$, and stores $P_{PIRTP}$ in the expected reception power storage unit.

When the storage into the expected reception power storage unit is again performed (next time and after), the expected reception power determination unit 30 may update the previous storage value.

Based on the non-contention type preamble transmission number information, the expected reception power determination unit 30 computes the expected reception power $P_{PIRTP}$. An example of the computation will be shown later.

When the expected reception power determination unit 30 receives an expected reception power determination timing signal from the expected reception power determination timing generation unit 40, the expected reception power determination unit 30 reads out the most recent expected reception power $P_{PIRTP}$ from the expected reception power storage unit at the timing of the signal reception, and communicates the expected reception power $P_{PIRTP}$ to the set value notification unit 70.

The expected reception power determination timing generation unit 40 generates the above-described expected reception power determination timing signal and supplies the generated signal to the expected reception power determination unit 30, regularly. The period for generating the expected reception power determination timing signal may be fixed, where it may not be strictly fixed.

In the present embodiment, the expected reception power determination timing generation unit 40 receives a period or time designated by an operator, and generates the expected reception power determination timing signal in accordance with the period or time.

The expected reception power determination timing generation unit 40 may vary the period in accordance with the amount of the non-contention type preamble transmission number information, which is acquired by the expected reception power determination unit 30. In such a case, for example, (i) when the amount of the non-contention type preamble transmission number information per unit time exceeds a threshold, the expected reception power determination timing generation unit 40 shortens the period for generating the expected reception power determination timing signal; and (ii) when the amount of the non-contention type preamble transmission number information per unit time becomes less than or equal to the threshold, the expected reception power determination timing generation unit 40 increases the period for generating the expected reception power determination timing signal.

The wireless resource amount determination unit 50 has a random access storage unit (not shown) as a work area, which may be implemented using a memory.

Until a wireless resource amount determination timing signal is supplied from the wireless resource amount determination timing generation unit 60, the wireless resource amount determination unit 50 receives the contention type preamble transmission number information supplied from the reception information selecting unit 20, and stores the received information into the storage unit. That is, during a time period from the immediately previous reception of the wireless resource amount determination timing signal to the current reception of the wireless resource amount determination timing signal, the wireless resource amount determination unit 50 acquires the contention type preamble transmission number information supplied from the reception information selecting unit 20, and stores the received information into the storage unit.

When the wireless resource amount determination timing signal is received from the wireless resource amount determination timing generation unit 60, the wireless resource amount determination unit 50 computes, based on the information stored in the storage unit, a failure rate for the initial transmission of the contention type RA preamble at the timing of the signal reception, and further computes an amount of wireless resources which indicates an amount of resources (e.g., the number of subframes per unit time) required for sending the RA preamble from the communication terminal to the present base station. The subframe is a minimum unit in the time direction for a time-frequency wireless resource region. The temporal length of one subframe is defined as 1 msec in LTE. An example of computing the failure rate for the initial transmission and the amount of wireless resources will be shown later.

The wireless resource amount determination unit 50 supplies the computed amount of resources to the set value notification unit 70.

The wireless resource amount determination timing generation unit 60 generates the above-described wireless resource amount determination timing signal and supplies the generated signal to the wireless resource amount determination unit 50, regularly. The period for generating the wireless resource amount determination timing signal may be fixed, where it may not be strictly fixed. In the present embodiment, the wireless resource amount determination timing generation unit 60 receives a period or time designated by an operator, and generates the wireless resource amount determination timing signal in accordance with the period or time.

The wireless resource amount determination timing generation unit 60 may vary the period in accordance with the amount of the contention type preamble transmission number information, which is acquired by the wireless resource amount determination unit 50. In such a case, for example, (i) when the amount of the contention type preamble transmission number information per unit time exceeds a threshold, the wireless resource amount determination timing generation unit 60 shortens the period for generating the wireless resource amount determination timing signal; and (ii) when the amount of the non-contention, type preamble transmission number information per unit time becomes less than or equal to the threshold, the wireless resource amount determination timing generation unit 60 increases the period for generating the wireless resource amount determination timing signal.

Based on any one of the expected reception power $P_{PIRTP}$ supplied from the expected reception power determination unit 30 and the amount of wireless resources supplied from the wireless resource amount determination unit 50, the set value notification unit 70 generates and outputs initial access setting information.

More specifically, when receiving the expected reception power $P_{PIRTP}$ from the expected reception power determination unit 30, the set value notification unit 70 acquires the expected reception power $P_{PIRTP}$, includes it into each of the contention type initial access setting information and the non-contention type initial access setting information based on, for example, a notification format defined in the LTE standard specification, and outputs the relevant information.

In addition, when receiving the amount of wireless resources from the wireless resource amount determination unit 50, the set value notification unit 70 acquires the amount of wireless resources, includes it into the contention type initial access setting information based on, for example, a notification format defined in the LTE standard specification, and outputs the relevant information.

The set value communication unit 70 may include the amount of wireless resources into each of the contention type initial access setting information and the non-contention type initial access setting information.

When receiving the contention type initial access setting information output from the set value communication unit 70, the present base station subjects the information to broadcast transmission. Additionally, when receiving the non-contention type initial access setting information output from the set value communication unit 70, the present base station sends the information to the corresponding communication terminal.

Figure 2A:
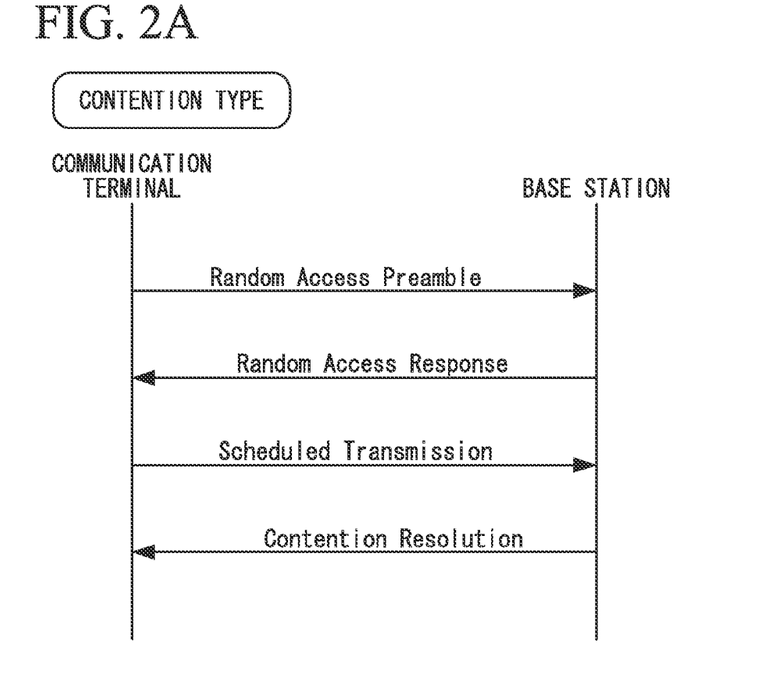
FIG. 2A is a sequence diagram for a contention type random access procedure.
Figure 2B:
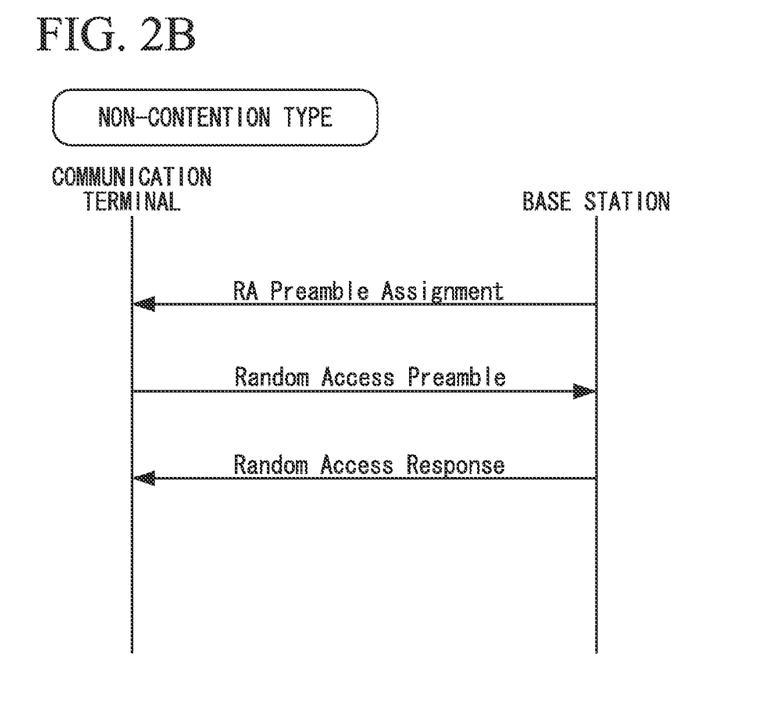
FIG. 2B is a sequence diagram for a non-contention type random access procedure.

FIGS. 2A and 2B are sequence diagrams, each showing a RA procedure performed between the communication terminal and the base station. FIG. 2A is a sequence diagram for the contention type RA procedure, and FIG. 2B is a sequence diagram for the non-contention type RA procedure. Non-Patent Document 1 defines the procedures shown in the sequence diagrams in detail.

In FIG. 2A, the timing at which the initial access completion determination unit 10 determines the completion timing of the contention type RA procedure is set at the timing when the present base station sends a "Contention Resolution" signal to the relevant communication terminal.

In another example, the initial access completion determination unit 10 may perform the relevant determination in a manner such that the completion timing of the contention type RA procedure is set to the timing when the present base station receives a "Scheduled transmission" signal.

In FIG. 2B, the timing at which the initial access completion determination unit 10 determines the completion timing of the non-contention type RA procedure is set at the timing when the present base station sends a "Random Access Response" signal to the relevant communication terminal.

In another example, the initial access completion determination unit 10 may perform the relevant determination in a manner such that the completion timing of the non-contention type RA procedure is set to the timing when the present base station receives a "Random Access (RA) Preamble" signal.

Below, also referring to FIGS. 3 and 4, the operation of the initial access setting information generating apparatus 1 will be explained. In the following explanation, values set in the initial access setting information are the expected reception power $P_{PIRTP}$ and the amount of wireless resources.

Figure 3:
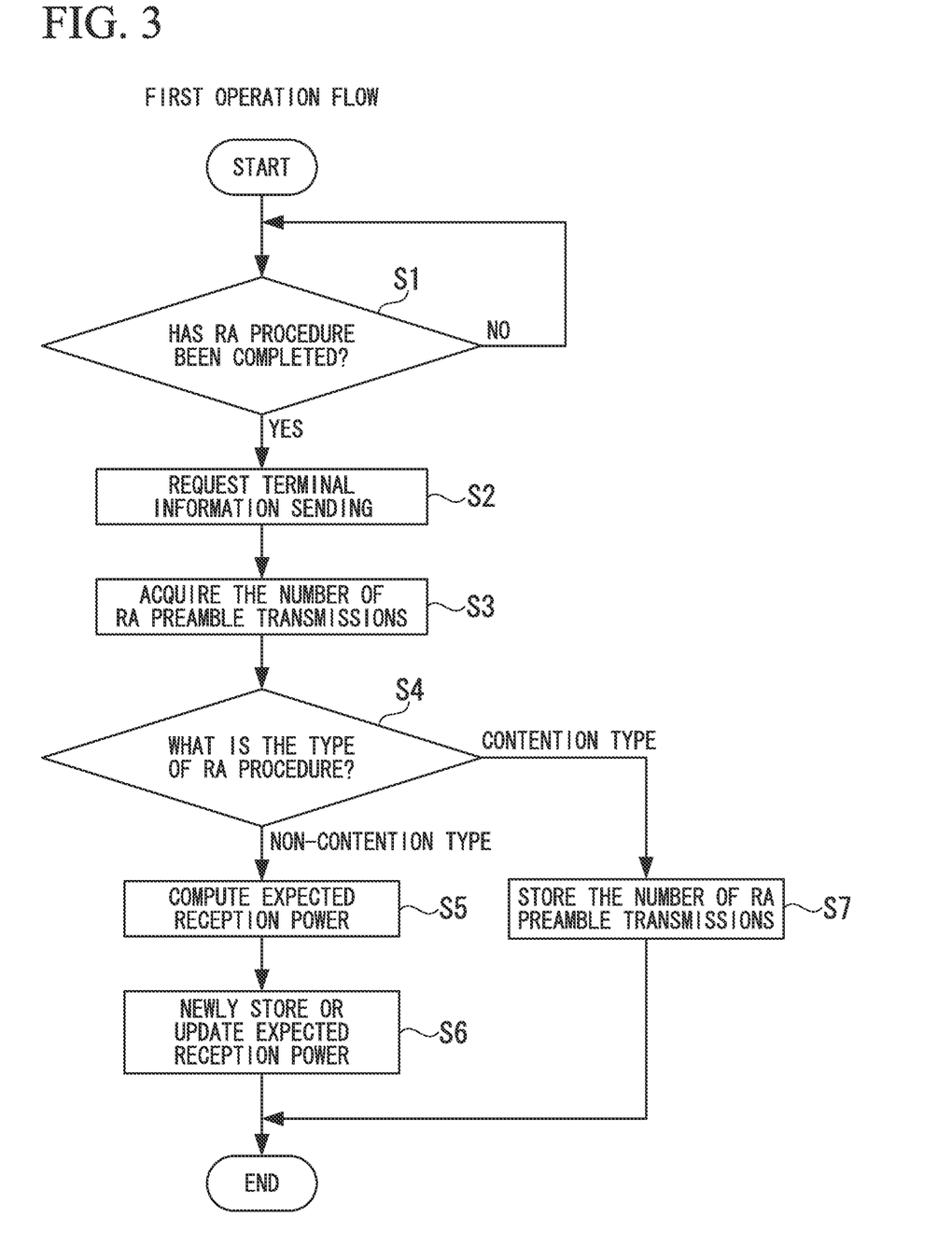
FIG. 3 is a flowchart showing a first operation flow performed by the initial access setting information generating apparatus in the present embodiment.

FIG. 3 is a flowchart showing a first operation flow performed by the initial access setting information generating apparatus 1.

In the first step S1, the initial access completion determination unit 10 determines whether or not the RA procedure performed between the present base station and the communication terminal has been completed. If it is determined that the RA procedure has been completed, the initial access completion determination unit 10 acquires the type of the RA procedure, and the operation proceeds to step S2.

In the next step S2, the initial access completion determination unit 10 requests the communication terminal, for which the RA procedure completion has been determined, to send terminal information.

In the next step S3, the initial access completion determination unit 10 acquires the terminal information which is sent from the communication terminal in response to the sending request in step S2 and is received by the present base station. From the acquired terminal information, the initial access completion determination unit 10 extracts information which indicates the number of RA preamble transmissions.

The initial access completion determination unit 10 then supplies RA procedure type information which indicates the type of the RA procedure acquired in step S1 and information which indicates the above number of RA preamble transmissions, to the reception information selecting unit 20.

In the next step S4, the reception information selecting unit 20 acquires the RA procedure type information and the information which indicates the above number of RA preamble transmissions, supplied from the initial access completion determination unit 10. The reception information selecting unit 20 then performs determination about the RA procedure type information.

If it is determined that the RA procedure type information indicates the non-contention type, the reception information selecting unit 20 supplies the information which indicates the number of RA preamble transmissions, as non-contention type preamble transmission number information, to the expected reception power determination unit 30. The operation proceeds to step S5.

If it is determined that the RA procedure type information indicates the contention type, the reception information selecting unit 20 supplies the information which indicates the number of RA preamble transmissions, as contention type preamble transmission number information, to the wireless resource amount determination unit 50. The operation proceeds to step S7.

In step S5, the expected reception power determination unit 30 acquires the non-contention type preamble transmission number information supplied from the reception information selecting unit 20, and computes the expected reception power $P_{PIRTP}$ based on the non-contention type preamble transmission number information.

More specifically, the expected reception power determination unit 30 obtains the expected reception power $P_{PIRTP}$ by computing the following Formula (3).

$$P_{PIRTP} = \begin{cases} P_{PIRTP} & \text{if } (PHR \leq 0) \\ P_{PIRTP} - (1 - R_{target}) \cdot \delta_{step} & elseif(N_{preambleSent} == 1) \\ P_{PIRTP} + R_{target} \cdot \delta_{step} & \text{else} \end{cases} \quad (3)$$

In Formula (3), $R_{target}$ indicates a requested success rate for the initial transmission of the RA preamble; $\delta_{step}$ indicates an adjustment width; $N_{preambleSent}$ indicates the number of non-contention type RA preamble transmissions included in the non-contention type preamble transmission number information; and PHR (power headroom) is information which indicates a difference between the maximum transmission power of the relevant communication terminal and a requested transmission power communicated by the present base station (i.e., maximum transmission power−requested transmission power).

In the present embodiment, the expected reception power determination unit 30 receives the adjustment width $\delta_{step}$ designated by an operator. The expected reception power determination unit 30 also extracts the PHR, which is included in the header of information sent from the communication terminal to the present base station, and applies the PHR to Formula (3).

According to Formula (3), if the communication terminal is performing the transmission with a power lower than or equal to the maximum transmission power of the relevant communication terminal (first condition), the expected reception power $P_{PIRTP}$ computed by the expected reception power determination unit 30 is a value so as to maintain the current expected reception power.

Also according to Formula (3), if the present base station has received the RA preamble in the initial transmission (i.e., first trial) from the communication terminal (second condition), the expected reception power $P_{PIRTP}$ computed by the expected reception power determination unit 30 is a value so as to decrease the current expected reception power.

Also according to Formula (3), in a case other than the first and second conditions (third condition), the expected reception power $P_{PIRTP}$ computed by the expected reception power determination unit 30 is a value so as to increase the current expected reception power.

In accordance with the computation corresponding to the first condition for Formula (3), even when the communication terminal, which is performing the transmission with the maximum transmission power, has sent the non-contention type RA preamble several times, the expected reception power $P_{PIRTP}$ is not changed. Therefore, it is possible to prevent the expected reception power $P_{PIRTP}$ from becoming too high. If it is assumed that the expected reception power $P_{PIRTP}$ is increased, an expected value for the number of transmissions for the non-contention type RA preamble from the communication terminal, which is performing the transmission with the maximum transmission power, is not changed. This result also makes Formula (3) effective.

In accordance with the computations corresponding to the second and third conditions for Formula (3), the expected reception power $P_{PIRTP}$ can be set so as to implement the requested success rate $R_{target}$.

The method of computing the expected reception power $P_{PIRTP}$ by the expected reception power determination unit 30 is not limited to Formula (3), and any computation method based on the non-contention type preamble transmission number information may be employed.

In the next step S6, the expected reception power determination unit 30 stores the computed expected reception power $P_{PIRTP}$ into the expected reception power storage unit, and the operation of the present flowchart is completed.

The storage into the expected reception power storage unit may be performed by storing each value sequentially, or by updating the previous (stored) value.

On the other hand, in step 7, the wireless resource amount determination unit 50 receives the contention type preamble transmission number information supplied from the reception information selecting unit 20, and stores the received information into the storage unit. The operation of the present flowchart is then completed.

Figure 4:
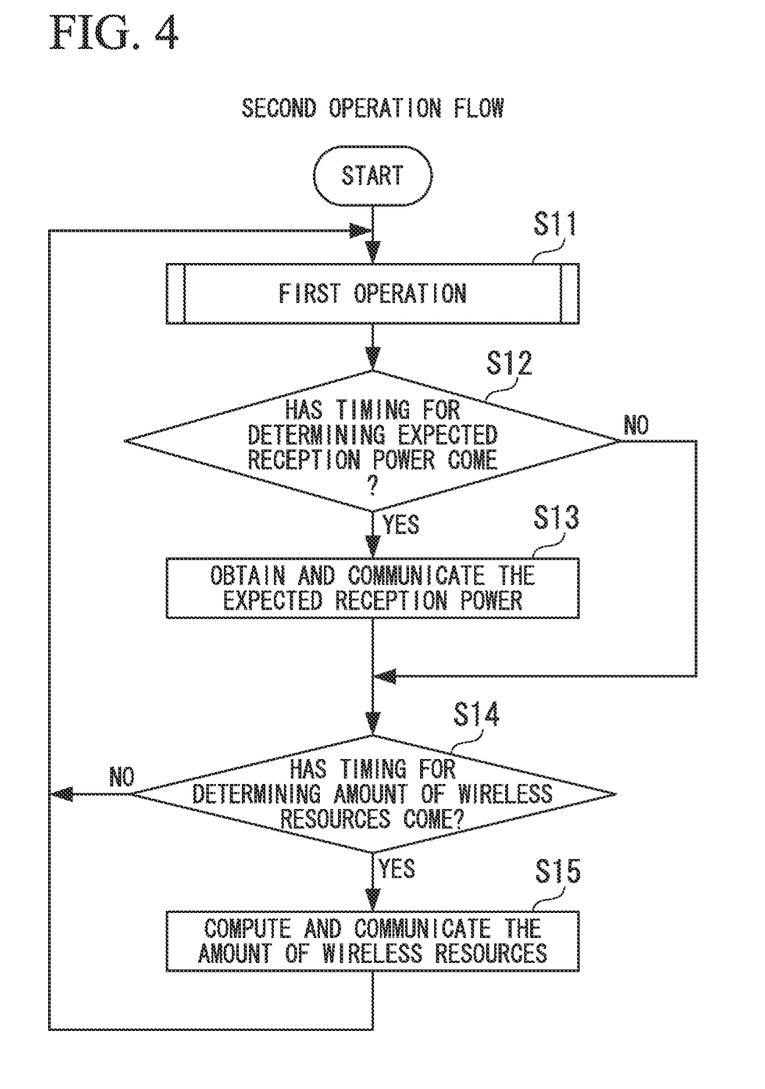
FIG. 4 is a flowchart showing a second operation flow performed by the initial access setting information generating apparatus in the present embodiment.

FIG. 4 is a flowchart showing a second operation flow performed by the initial access setting information generating apparatus 1.

In step S11, the initial access setting information generating apparatus 1 executes the operation (steps S1 to S7) in the flowchart shown in FIG. 3.

In the next step S12, the expected reception power determination unit 30 determines whether or not an expected reception power determination timing signal has been received from the expected reception power determination timing generation unit 40.

Although it is not shown in the relevant flowchart, the expected reception power determination timing generation unit 40 periodically generates the expected reception power determination timing signal and supplies it to the expected reception power determination unit 30.

If the expected reception power determination unit 30 determines that the expected reception power determination timing signal has been received, the operation proceeds to step S13. If the expected reception power determination unit 30 determines that the expected reception power determination timing signal has not yet been received, the operation proceeds to step S14.

In step S13, the expected reception power determination unit 30 retrieves the most recent expected reception power $P_{PIRTP}$ from the expected reception power storage unit, and supplies the expected reception power $P_{PIRTP}$ to the set value communication unit 70.

Based on the expected reception power $P_{PIRTP}$ supplied from the expected reception power determination unit 30, the set value communication unit 70 generates and outputs the initial access setting information.

More specifically, when receiving the expected reception power $P_{PIRTP}$ from the expected reception power determination unit 30, the set value communication unit 70 includes the acquired $P_{PIRTP}$ into each of the contention type initial access setting information and the non-contention type initial access setting information based on, for example, a notification format defined in the LTE standard specification, and outputs the relevant information.

The operation proceeds to step S14.

In step S14, the wireless resource amount determination unit 50 determines whether or not a wireless resource amount determination timing signal has been received from the wireless resource amount determination timing generation unit 60.

Although it is not shown in the flowchart of FIG. 4, the wireless resource amount determination timing generation unit 60 periodically generates the wireless resource amount determination timing signal and supplies it to the wireless resource amount determination unit 50.

If the wireless resource amount determination unit 50 determines that the wireless resource amount determination timing signal has been received, the operation proceeds to step S15. If the wireless resource amount determination unit 50 determines that the wireless resource amount determination timing signal has not yet been received, the operation returns to step S11.

In step S15, the wireless resource amount determination unit 50 obtains the failure rate for the initial transmission of the RA preamble based on the information stored in the storage unit, and also computes the amount of wireless resources.

More specifically, the wireless resource amount determination unit 50 obtains the number $N'_{subframe}$ of subframes as the amount of wireless resources, by computing Formulas (4) and (5).

First, the wireless resource amount determination unit 50 uses the contention type preamble transmission number information so as to compute a failure rate $R_{1stTrans}$ for the initial transmission of the RA preamble in the contention type RA procedure, based on Formula (4).

$$R_{1stTrans} = 1 - \frac{N_{1stTrans}}{N_{RAProcedure}} \quad (4)$$

In Formula (4), $N_{1stTrans}$ indicates the number of RA preambles for the contention type RA procedure, which could be received by the present base station through the relevant initial transmission, within any period defined for the relevant statistical computation (here, a period corresponding to the interval for the supply of the wireless resource amount determination timing signal); and $N_{RAProcedure}$ indicates the number of completion events, in each of which the contention type RA procedure has been completed within the above period for the statistical computation.

Next, the wireless resource amount determination unit 50 obtains the number N'$_{subframe}$ of subframes by computing the following Formula (5).

$$\text{If } \left( \frac{R_{credible}}{R_{target1stTrans}} < N_{RAProcedure} \right) \quad N'_{subframe} = \frac{R_{1stTrans}}{R_{target1stTrans}} \cdot N_{subframe} \quad (5)$$

$$\text{Elseif}(R_{1stTrans} > R_{target1stTrans}) \quad N'_{subframe} = N_{subframe} + \alpha$$

$$\text{Else} \quad N'_{subframe} = N_{subframe} - \alpha$$

In Formula (5), R$_{credible}$ means a redundancy rate for the population parameter required when computing the failure rate R$_{1stTrans}$ for the initial transmission; R$_{target1stTrans}$ indicates a permissive failure rate for the initial transmission of the RA preamble in the contention type RA procedure; and N$_{subframe}$ means the number of subframes, which is currently set in the above period for the statistical computation.

Also in Formula (5), "N'$_{subframe}$=N$_{subframe}$+α" means to increase N'$_{subframe}$ from N$_{subframe}$ by one step (i.e., a unit value). In contrast, "N'$_{subframe}$=N$_{subframe}$−α" means to decrease N'$_{subframe}$ from N$_{subframe}$ by one step.

In an example case employing LTE, the numbers of subframes, which can be assigned to RA procedures, may be discrete such as 1, 2, 3, 5, and 10. Therefore, a in Formula (5) is set to an increase or decrease width in conformity with the relevant communication standard. For example, in LTE, if N$_{subframe}$=3; a condition "R$_{credible}$/R$_{target1stTrans}$<N$_{RAProcedure}$" is not satisfied; and a condition "R$_{1stTrans}$>R$_{target1stTrans}$" is satisfied, the wireless resource amount determination unit 50 sets N'$_{subframe}$ to 5. Additionally, if N$_{subframe}$=10; a condition "R$_{credible}$/R$_{target1stTrans}$<N$_{RAProcedure}$" is not satisfied; and a condition "R$_{1stTrans}$>R$_{target1stTrans}$" is satisfied, the wireless resource amount determination unit 50 sets N'$_{subframe}$ to 10.

According to Formula (5), if the number N$_{RAProcedure}$ of RA procedure completion events indicates a number of samples required for securing reliability of the relevant statistic in the above period for the statistical computation (condition 'a'), the wireless resource amount determination unit 50 computes the number N'$_{subframe}$ of subframes based on the failure rate R$_{1stTrans}$ for the initial transmission of the RA preamble and the permissive failure rate R$_{target1stTrans}$ for the initial transmission of the RA preamble.

Also according to Formula (5), if the failure rate R$_{1stTrans}$ for the initial transmission of the RA preamble is larger than the permissive failure rate R$_{target1stTrans}$ for the initial transmission of the RA preamble (condition 'b'), the number N'$_{subframe}$ of subframes computed by the wireless resource amount determination unit 50 has a value increased by one step (i.e., a unit value).

Also according to Formula (5), if the failure rate R$_{1stTrans}$ for the initial transmission of the RA preamble is smaller than or equal to the permissive failure rate R$_{target1stTrans}$ for the initial transmission of the RA preamble (condition 'c'), the number N'$_{subframe}$ of subframes computed by the wireless resource amount determination unit 50 has a value decreased by one step.

The method of computing the number N'$_{subframe}$ of subframes by the wireless resource amount determination unit 50 is not limited to Formula (5), and any computation method based on the contention type preamble transmission number information may be employed.

The wireless resource amount determination unit 50 then supplies the computed number N'$_{subframe}$ of subframes (as an amount of wireless resources) to the set value communication unit 70.

Based on the amount of wireless resources supplied from the wireless resource amount determination unit 50, the set value communication unit 70 generates and sets the initial access setting information.

More specifically, when receiving the amount of wireless resources from the wireless resource amount determination unit 50, the set value communication unit 70 includes the acquired amount of wireless resources into the contention type initial access setting information based on, for example, a notification format defined in the LTE standard specification, and outputs the relevant information.

In the above process, the set value communication unit 70 may include the amount of wireless resources into each of the non-contention type initial access setting information and the contention type initial access setting information.

The operation then returns to step S11.

As described above, the initial access setting information generating apparatus 1 as an embodiment of the present invention computes the expected reception power P$_{PIRTP}$ based on the number of transmissions of the RA preamble (from a communication terminal which has moved from an adjacent base station to the present base station by means of handover) in a previously-completed non-contention type RA procedure, that is, based on the non-contention type preamble transmission number information. The initial access setting information generating apparatus 1 applies the computed expected reception power P$_{PIRTP}$ to the initial access setting information.

Therefore, it is possible to prevent an increase in the number of RA preamble transmissions due to code collision. Accordingly, the initial access setting information generating apparatus 1 of the present embodiment can satisfy the requested success rate R$_{target}$ for the initial transmission, and reduce interference to an adjacent base station, thereby reducing power consumption of the relevant communication terminal.

In addition, the initial access setting information generating apparatus 1 of the present embodiment includes the expected reception power P$_{PIRTP}$, which is computed based on the non-contention type preamble transmission number information, into each of the non-contention type initial access setting information and the contention type initial access setting information.

Therefore, the expected reception power P$_{PIRTP}$ is applied to each of the non-contention type and contention type RA procedures, so that a desirable communication quality of the RA preamble can be secured, and an appropriate amount of wireless resources can be determined, thereby preventing pressure to data channels or an decrease in system usage efficiency for data channels.

In the above-described embodiment, if a condition "R$_{credible}$/R$_{target1stTrans}$<N$_{RAProcedure}$" for Formula (5) is satisfied, the wireless resource amount determination unit 50 may compute the number N'$_{subframe}$ of subframes, as follows.

It can be assumed that occurrence of the RA procedure for a communication terminal follows a Poisson distribution. Therefore, a code collision rate P$_{coll}^{UE}$ is represented by the following Formula (6), where P$_{coll}^{UE}$ corresponds to the failure rate R$_{1stTrans}$ for the initial transmission of the RA preamble in the contention type RA procedure.

$$P_{coll}^{UE} = 1 - e^{-G/L}\left(1 + \frac{1}{G/L}\right) \quad (6)$$

In Formula (6), G indicates the number of occurrence events of the contention type RA procedure (i.e., how many times the procedure has been performed); and L denotes the number of resources for PRACHs which can be selected by the relevant communication terminal, more specifically, "the number of codes×the number of subframes" in the contention type RA procedure.

Based on the failure rate $R_{1stTrans}$ for the initial transmission computed by Formula (4) and the number L of resources obtained by the number $N_{subframe}$ of the current subframes, the wireless resource amount determination unit 50 computes the current number G of occurrence events of the contention type RA procedure.

Next, based on the above-computed number G of occurrence events and the permissive failure rate $R_{target1stTrans}$ for the initial transmission of the RA preamble, the wireless resource amount determination unit 50 computes the number L of resources for the PRACHs by using Formula (6).

The wireless resource amount determination unit 50 then computes the number $N'_{subframe}$ of subframes by dividing the above-computed number L of resources by the number of codes required in the contention type RA procedure.

Additionally, in the present embodiment, the initial access setting information generating apparatus 1 has been explained as an example provided at a base station. However, this is not a limiting condition, and the initial access setting information generating apparatus 1 may be provided so as to connect to a network which connects base stations to each other.

In addition, the functions of the initial access setting information generating apparatus 1 may be implemented using a computer. In this case, an initial access setting information generating program for executing the relevant control functions may be stored in a computer readable storage medium, and the initial access setting information generating program stored in the storage medium may be loaded and executed on a computer system, so as to implement the functions. Here, the computer system may have hardware resources which include an OS (operating system) and peripheral devices.

The above computer readable storage medium is a storage device, for example, a portable medium such as a flexible disk, a magneto optical disk, or a memory card, or a memory device such as a magnetic hard disk built in a computer system.

The computer readable storage medium may also include a device for temporarily storing the program, for example, (i) a device for dynamically storing the program for a short time, such as a communication line used when transmitting the program via a network (e.g., the Internet) or a communication line (e.g., a telephone line), or (ii) a volatile memory in a computer system which functions as a server or client in such a transmission.

In addition, the program may execute a part of the above-explained functions. The program may also be a "differential" program so that the above-described functions can be executed by a combination program of the differential program and an existing program which has already been stored in the relevant computer system.

While preferred embodiments of the present invention have been described and illustrated above, it should be understood that these are exemplary embodiments of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An initial access setting information generating apparatus comprising:
    a reception information selecting unit wherein when an initial access procedure performed between a base station and a communication terminal has been completed, the reception information selecting unit determines whether the initial access procedure is of a non-contention type or a contention type, and:
    if determining that the initial access procedure is of the non-contention type, the reception information selecting unit outputs number of transmissions for preamble information in the initial access procedure, the number being supplied from the communication terminal, as non-contention type preamble transmission number, and
    if determining that the initial access procedure is of the contention type, the reception information selecting unit outputs number of transmissions for preamble information as contention type preamble transmission number;
    an expected reception power determination unit that determines an expected reception power at the base station, based on the non-contention type preamble transmission number output from the reception information selecting unit and a determined success rate; and
    a set value communication unit that generates and outputs initial access setting information about the initial access procedure for the communication terminal, based on the expected reception power determined by the expected reception power determination unit.

2. The initial access setting information generating apparatus in accordance with claim 1, wherein:
    every time the reception information selecting unit outputs the non-contention type preamble transmission number, the expected reception power determination unit computes and stores an expected reception power value at the base station based on the non-contention type preamble transmission number; and
    the expected reception power determination unit retrieves a most recent value from among the stored expected reception power values and determines the retrieved value to be the expected reception power, periodically.

3. The initial access setting information generating apparatus in accordance with claim 2, wherein:
    the set value communication unit generates and outputs contention type initial access setting information and non-contention type initial access setting information, based on the expected reception power determined by the expected reception power determination unit.

4. The initial access setting information generating apparatus in accordance with claim 1, wherein:
    the set value communication unit generates and outputs contention type initial access setting information and non-contention type initial access setting information, based on the expected reception power determined by the expected reception power determination unit.

5. The initial access setting information generating apparatus in accordance with claim 1, wherein the expected reception power determination unit:
    maintains the current expected reception power if a maximum transmission power of the communication terminal, for which the non-contention type initial access procedure has been completed, does not exceed a predetermined value;

determines, if the non-contention type preamble transmission number is 1, the expected reception power so as to decrease the current expected reception power; and otherwise, determines the expected reception power so as to increase the current expected reception power.

6. The initial access setting information generating apparatus in accordance with claim 5, wherein:

the predetermined value is a requested transmission power communicated to the communication terminal by the base station.

7. An initial access setting information generating method comprising:

a reception information selecting step wherein when an initial access procedure performed between a base station and a communication terminal has been completed, the reception information selecting step determines whether the initial access procedure is of a non-contention type or a contention type, and:

if determining that the initial access procedure is of the non-contention type, the reception information selecting step outputs number of transmissions for preamble information in the initial access procedure, the number being supplied from the communication terminal, as non-contention type preamble transmission number, and if determining that the initial access procedure is of the contention type, the reception information selecting step outputs number of transmissions for preamble information as contention type preamble transmission number;

an expected reception power determination step that determines an expected reception power at the base station, based on the non-contention type preamble transmission number output in the reception information selecting step and a determined success rate; and a set value communication step that generates and outputs initial access setting information about the initial access procedure for the communication terminal, based on the expected reception power determined by the expected reception power determination step.

8. The initial access setting information generating method in accordance with claim 7, wherein the expected reception power determination step:

maintains the current expected reception power if a maximum transmission power of the communication terminal, for which the non-contention type initial access procedure has been completed, does not exceed a predetermined value;

determines, if the non-contention type preamble transmission number is 1, the expected reception power so as to decrease the current expected reception power; and otherwise, determines the expected reception power so as to increase the current expected reception power.

9. The initial access setting information generating method in accordance with claim 8, wherein:

the predetermined value is a requested transmission power communicated to the communication terminal by the base station.

10. An initial access setting information generating program in a non-transitory computer readable storage medium that makes a computer execute:

a reception information selecting step wherein when an initial access procedure performed between a base station and a communication terminal has been completed, the reception information selecting step determines whether the initial access procedure is of a non-contention type or a contention type, and:

if determining that the initial access procedure is of the non-contention type, the reception information selecting step outputs number of transmissions for preamble information in the initial access procedure, the number being supplied from the communication terminal, as non-contention type preamble transmission number, and if determining that the initial access procedure is of the contention type, the reception information selecting step outputs number of transmissions for preamble information as contention type preamble transmission number;

an expected reception power determination step that determines an expected reception power at the base station, based on the non-contention type preamble transmission number output in the reception information selecting step and a determined success rate; and a set value communication step that generates and outputs initial access setting information about the initial access procedure for the communication terminal, based on the expected reception power determined by the expected reception power determination step.

11. The initial access setting information generating program in a non-transitory computer readable storage medium in accordance with claim 10, wherein the expected reception power determination step:

maintains the current expected reception power if a maximum transmission power of the communication terminal, for which the non-contention type initial access procedure has been completed, does not exceed a predetermined value;

determines, if the non-contention type preamble transmission number is 1, the expected reception power so as to decrease the current expected reception power; and otherwise, determines the expected reception power so as to increase the current expected reception power.

12. The initial access setting information generating program in a non-transitory computer readable storage medium in accordance with claim 11, wherein:

the predetermined value is a requested transmission power communicated to the communication terminal by the base station.

13. A base station apparatus comprising:

a reception information selecting unit wherein when an initial access procedure performed together with a communication terminal has been completed, the reception information selecting unit determines whether the initial access procedure is of a non-contention type or a contention type, and:

if determining that the initial access procedure is of the non-contention type, the reception information selecting unit outputs number of transmissions for preamble information in the initial access procedure, the number being supplied from the communication terminal, as non-contention type preamble transmission number, and if determining that the initial access procedure is of the contention type, the reception information selecting unit outputs number of transmissions for preamble information as contention type preamble transmission number;

an expected reception power determination unit that determines an expected reception power, based on the non-contention type preamble transmission number output from the reception information selecting unit and a determined success rate; and a set value communication unit that generates and outputs initial access setting information about the initial access procedure for the communication terminal, based on the expected reception power determined by the expected reception power determination unit.

14. The base station apparatus in accordance with claim 13, wherein the expected reception power determination unit:
   maintains the current expected reception power if a maximum transmission power of the communication terminal, for which the non-contention type initial access procedure has been completed, does not exceed a predetermined value;
   determines, if the non-contention type preamble transmission number is 1, the expected reception power so as to decrease the current expected reception power; and
   otherwise, determines the expected reception power so as to increase the current expected reception power.

15. The base station apparatus in accordance with claim 14, wherein:
   the predetermined value is a requested transmission power communicated to the communication terminal by the base station.

* * * * *